May 27, 1952
J. O. HOLDEN
2,598,382
GRASS CATCHER FOR LAWN MOWERS
Filed Feb. 17, 1947
3 Sheets-Sheet 1
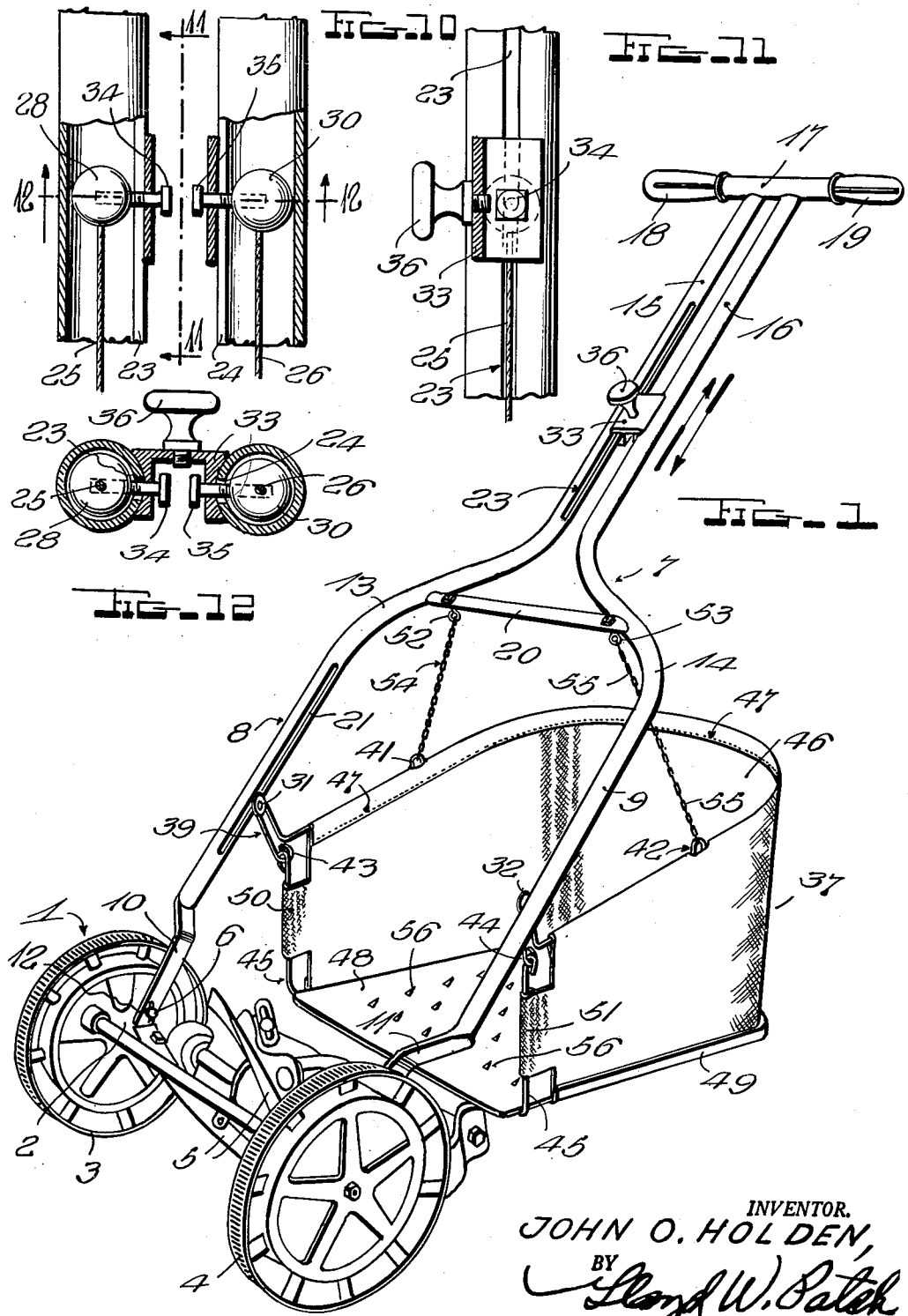
INVENTOR.
JOHN O. HOLDEN,
BY
Lloyd W. Patch
ATTORNEY May 27, 1952  J. O. HOLDEN  2,598,382
GRASS CATCHER FOR LAWN MOWERS
Filed Feb. 17, 1947  3 Sheets-Sheet 2
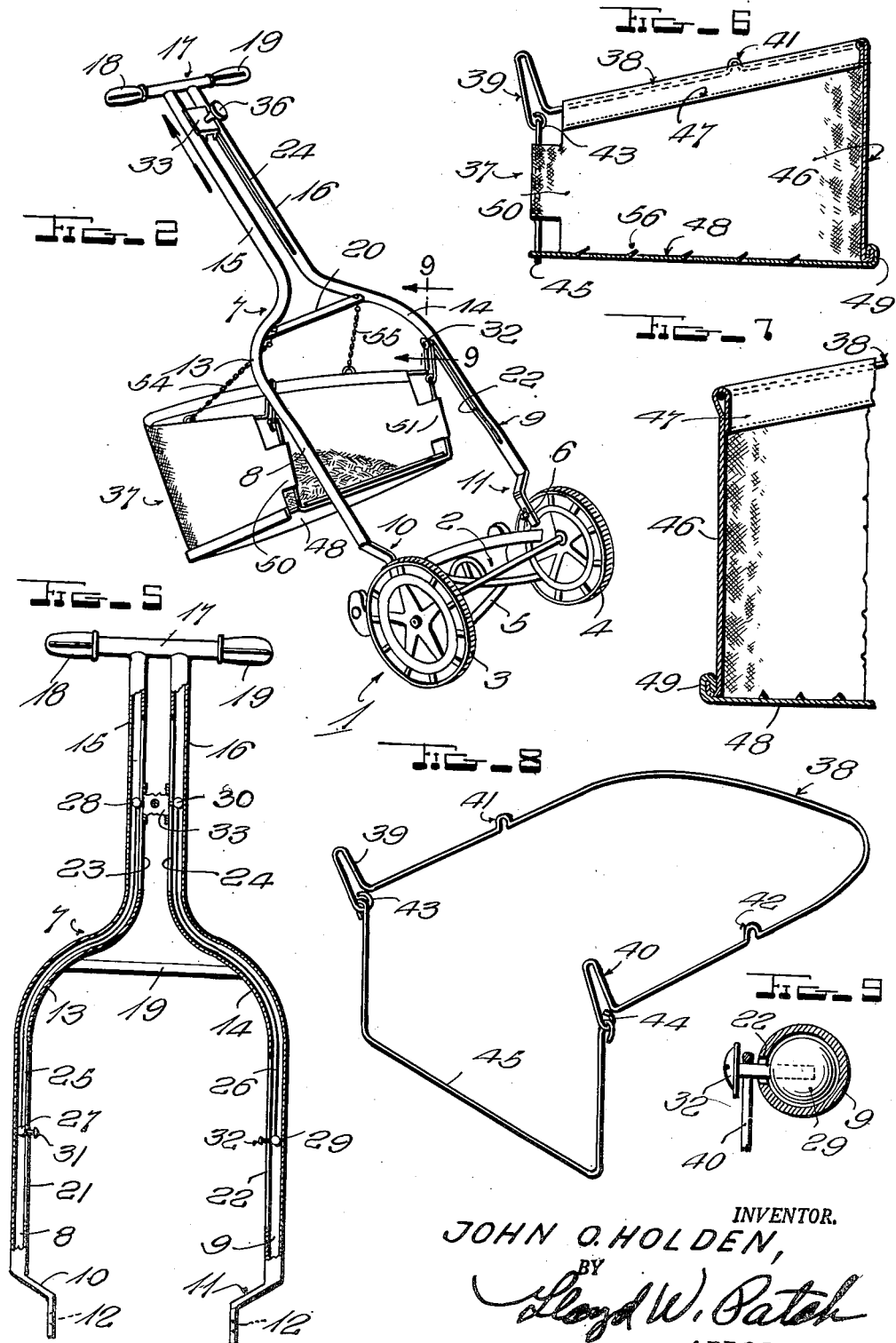
INVENTOR.
JOHN O. HOLDEN,
BY
Lloyd W. Patch
ATTORNEY May 27, 1952     J. O. HOLDEN     2,598,382
GRASS CATCHER FOR LAWN MOWERS
Filed Feb. 17, 1947     3 Sheets-Sheet 3
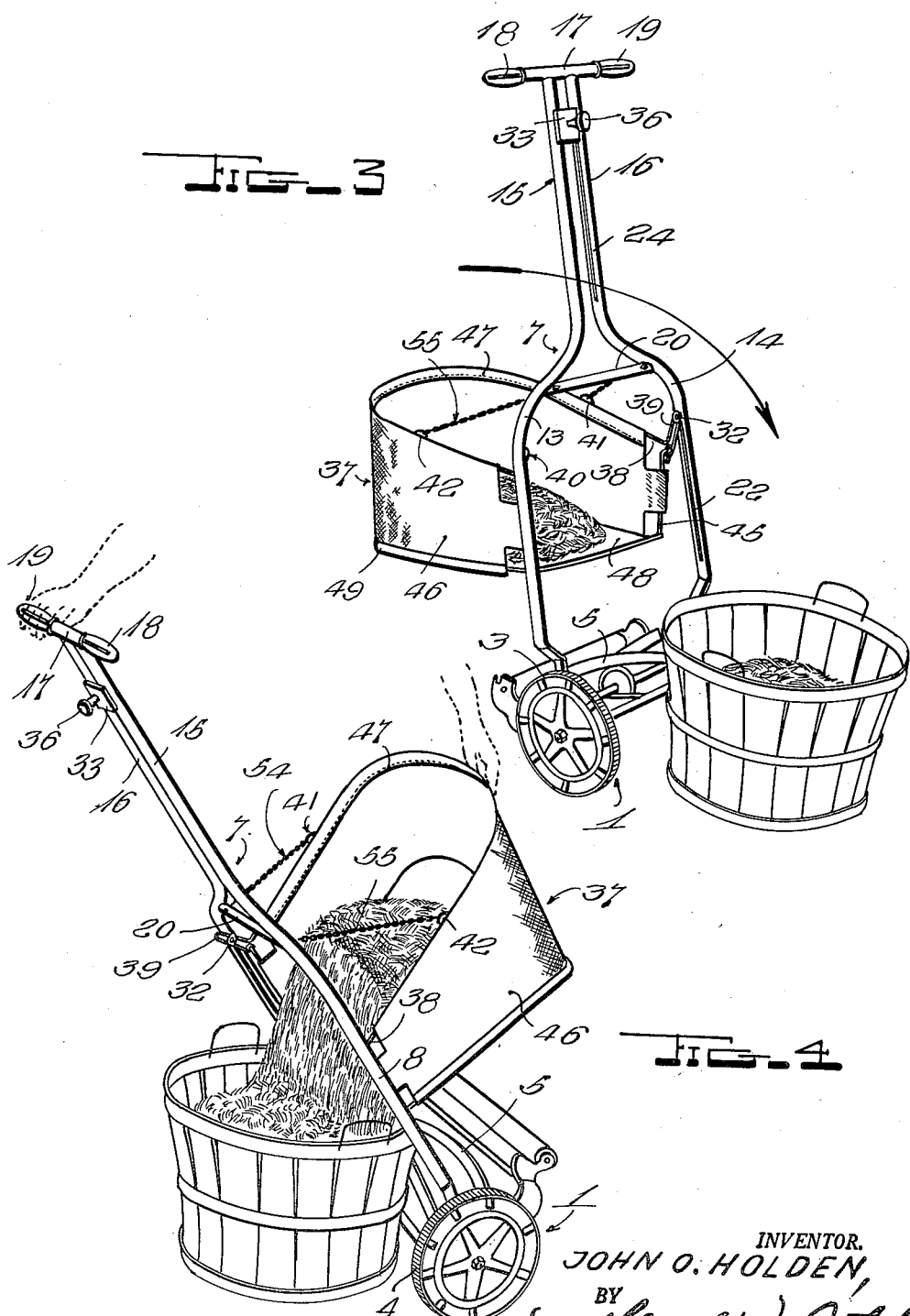
INVENTOR.
JOHN O. HOLDEN,
BY
ATTORNEY Patented May 27, 1952

2,598,382

UNITED STATES PATENT OFFICE 2,598,382

GRASS CATCHER FOR LAWN MOWERS

John O. Holden, Pueblo, Colo.

Application February 17, 1947, Serial No. 729,043

6 Claims. (Cl. 56—199)

My invention relates to improvements in grass catchers for lawn mowers, and particularly to devices of this character intended and adapted to be applied to and used with hand and power operated or power driven lawn mowers, to catch the clippings as cut and thrown back by a cutting reel or other cutting mechanism of the lawn mower.

An object is to provide such a handle and catcher unit for attachment to existing lawn mowers, or as standard equipment built into new lawn mowers, and with which the catcher can be quickly and easily detached when it is desired to use the lawn mower without a catcher.

Another object is to provide a handle that can be readily and quickly threaded to substantially all or most of the usual types and constructions of hand and small power operated or driven lawn mowers, without alteration of the mower and without employment of special operations or special tools; and, which handle has special provision for mounting and support and manipulation of the grass catcher.

Still another purpose is to so construct the handle and catcher and associated parts that the catcher can be adjusted to and will be carried in a position for most convenient and efficient use; and, at the same time the catcher can be quickly and easily removed when not desired for use, and the handle will be left to function efficiently and in the usual manner.

Yet another object is to so construct and associate the parts that means is provided to be conveniently and readily manually operated to raise the forward open side of the grass catcher and thus elevate the entire catcher to a position such that the mower and handle can be tipped forwardly for emptying and dumping clippings through the forward open side of the catcher into a low box, into a basket or other container, onto a flat canvas or piece of burlap, or in convenient piles on walks, driveways, or elsewhere, without detaching the catcher or manually lifting or handling the clippings or the catcher.

Another object is to provide a mounting for the catcher whereby the grass catcher can be tipped by raising and actuating a readily accessible handle portion and the clippings will be thrown to the rear of the catcher with no need to scoop the clippings back by hand, and at the same time this operation and the movement of the catcher to the position to dump the clippings can be accomplished with a minimum of manual effort and force, and with elimination of the back bending, time consuming operations connected with grass catchers heretofore used.

Yet another purpose is to so construct the parts that the handle yoke attaches to standard mowers on the same studs that hold the present handle, and there is no other attachment to the mower, with the yoke containing the catcher mounting and adjusting parts including a handle slide control which is fingertip operated and allows a variety of catcher adjustments and positions, without complicated parts or mechanisms likely to get out of adjustment or become damaged by use.

Still another purpose of my invention is to provide a grass catcher and supporting handle structure of simple and inexpensive construction that can be made and sold as a handle replacement for lawn mowers already in use, or can be installed as a part of a new mower as manufactured; and which will function and operate efficiently, with little likelihood of displacement or damage of the parts while in use.

With the above and other objects in view, some of which will be apparent to those skilled in the art, and others of which are inherent in the construction and installation and use of the structure, my invention includes certain novel features of construction and combinations and arrangements and associations of parts which will be hereinafter set forth in connection with the drawings and then pointed out in the claims.

In the drawings:

Figure 1 is a view in perspective showing an embodiment of my invention with a hand lawn mower of the rotary reel type.

Fig. 2 is a perspective view on a reduced scale showing the grass catcher raised preparatory to dumping clippings therefrom.

Fig. 3 is another perspective view on a reduced scale illustrating the mower and catcher swung toward a basket into which the clippings are to be dumped, and indicating the direction of swinging movement.

Fig. 4 is a view on the scale of Fig. 3 in perspective with the parts swung or moved to the dumping position.

Fig. 5 is a view in elevation, and partly in section, on the reduced scale of the handle and the adjusting means with the catcher removed.

Fig. 6 is a longitudinal vertical sectional view on the smaller scale through the grass catcher.

Fig. 7 is a fragmentary sectional view through one side of the grass catcher.

Fig. 8 is a perspective view to better show the supporting frame for the grass catcher.

Fig. 9 is a transverse sectional view, considerably enlarged, and taken substantially on line 9—9 of Fig. 2.

Fig. 10 is an enlarged fragmentary view, partly in section, to better show the operating and adjusting means for the grass catcher.

Fig. 11 is a vertical sectional view substantially on line 11—11 of Fig. 10.

Fig. 12 is a transverse sectional view substantially on line 12—12 of Fig. 10.

My invention is adaptable to be applied upon or built into, and to be used with various types and styles of lawn mowers, both hand operated mowers, and the smaller types of power lawn mowers.

In the present instance, I have illustrated an adaptation of my invention in connection with a hand operated lawn mower of the rotating cutting reel type; and, as the description progresses it will be understood and appreciated that with this adaptation, the handle structure and the grass catcher can be embodied as a part of the mower as manufactured, or these parts can be considered as applied to a lawn mower already in use.

In the adaptation as illustrated, the lawn mower is generally indicated at 1, and is of the hand pushed type. The frame 2 is mounted and carried on wheels 3 and 4, and the rotary cutting reel 5 is mounted and is operated in the usual manner. Handle mounting studs 6 are provided on the frame structure 2, and to all intents and purposes, all of the parts as described are substantially standard and usual parts of a lawn mower of the rotating reel type.

A yoke handle, generally designated at 7, is made of hollow tubing, and has tubular side bars 8 and 9 extending in parallel relation and spaced apart a distance corresponding substantially to the spacing of wheels 3 and 4. At their lower ends, the side bars 8 and 9 have bearing portions 10 and 11 offset inwardly to extend inside the wheels 3 and 4 and adjacent portions of the frame structure 2; and, these bearing portions are provided with bearing openings 12 receiving the handle mounting studs 6.

The tubular side bars 8 and 9 extend upwardly and rearwardly, and then are bent or shaped and offset inwardly, as at 13 and 14, with their ends then extending in proximate spaced-apart parallel relation, as at 15 and 16. A crossbar handle 17 is secured transversely across the terminal ends of portions 15 and 16, and this crossbar handle is provided at its ends with hand grip portions 18 and 19. A crossbar 20 is secured across between the portions 13 and 14, and thus a very strong and rigid yoke handle is provided, with the tubular portions 9, 14 and 16 providing a continuous and open tubular structure at one side, and the portions 8, 13 and 15 providing a continuous tubular structure at the other side.

Elongated slots 21 and 22 are formed longitudinally through the inner side of the side bars 8 and 9, and similar elongated slots 23 and 24 are formed longitudinally through the inner side of the extending portions 15 and 16. Flexible wires or cables 25 and 26, of the Bowden wire type, are endwise slidably fitted in the tubular side portions of the yoke handle, and have their ends terminating inside of the slots 21 and 23 on one side, and inside of the slots 22 and 24 on the opposite side.

As best seen in Fig. 5, the wire or cable 25 has balls 27 and 28 secured on the lower and upper ends thereof, and wire or cable 26 has balls 29 and 30 secured on its lower and upper ends, respectively.

Grass catcher mounting and supporting bolts 31 and 32 are turned into suitably threaded openings in the balls 27 and 29, and these mounting and supporting bolts extend through the slots 21 and 22. An adjusting handle block 33 is shaped after the manner shown in Fig. 12, to fit slidably between the parallel portions 15 and 16, and attaching bolts 34 and 35 connect this handle block with the balls 28 and 30, the attaching bolts being extended through and being slidable in the elongated slots 23 and 24. An adjusting knob or handle 36 is provided on the adjusting handle block 33, and this adjusting knob is thus so disposed that it is easily and readily accessible to be grasped for use in moving the adjusting block 33 upwardly and downwardly between the parallel portions 15 and 16, within the limits permitted by the elongated slots 23 and 24. The balls 27, 28, 29, and 30 are of smaller diameter than the inside diameter of the tubular side portions of the yoke handle, and these balls are thus freely movable, so that when the knob 36 is grasped and the adjusting block 33 is moved upwardly and downwardly, this will accomplish corresponding movement of the balls 27 and 29, and consequently movement of the mounting and supporting bolts 31 and 32 along the length of the longitudinal slots 21 and 22.

The grass catcher container, indicated at 37, has a top member 38 of generally U-shaped outline. Mounting loops 39 and 40 are provided at the ends of this member 38, and supporting loops 41 and 42 are formed to extend upwardly in the side arms. Rings or eyes 43 and 44 are provided at the extremities of the member 38, and a U-shaped supporting loop member 45 has eyes at its end connected in the rings or eyes 43 and 44, so that the member 45 is swingably mounted in depending relation. A side wall member 46, of canvas or other suitable material, is turned over at its upper edge and is stitched down around the U-shaped top member 38, as at 47, or is otherwise secured as a depending side wall, and the loops 39, 40, 41 and 42 are open above this side wall. A bottom member 48, of sheet metal or other suitable material, has its side and rear edges connected with the lower edge of the side wall member 46, and in Fig. 7 I have illustrated this connection accomplished by turning over and clinching down the edge of the bottom member 48 on the lower edge of the side wall member, as at 49. The forward edge of the bottom is supported by the crossbar of the loop member 45, and the ends 50 and 51 of the side wall member are carried around and are secured upon the arms of the supporting loop 45. It is preferable that these ends 50 and 51 of the side wall strip be of reduced width, so that the side wall 46 may be more yieldable, thus allowing complete and ready adjustment of the container to accommodate inequalities in the surface of the land over and upon which the lawn mower is being used and to make the container readily collapsible and foldable when removed.

Supporting eyes 52 and 53 are provided to depend from and adjacent to the ends of the crossbar 20, and carrier chains or cables 54 and 55 are detachably connected with these supporting eyes, the chains being connected at their lower ends with the supporting loops 41 and 42 of the top member 38 of the grass catcher carrier 37.

To mount the grass catcher carrier 37 in place for use, the mounting loops 39 and 40 are fitted or sprung over the mounting and supporting bolts 31 and 32, and carrier chains 54 and 55 are connected with the supporting eyes 52 and 53. The carrier 37 is adjusted to various desired positions by grasping the adjusting knob 36 and moving the adjusting block 33, the cables 25 and 26 being moved endwise within the tubular side portions of the yoke handle and the balls 27 and 29 at the lower ends of these cables being correspondingly moved to slide and adjust the mounting bolts 31 and 32 upwardly and downwardly within the limits of slots 21 and 22. Thus, the forward open side of the carrier 37 can be adjusted to any desired distance above the ground when in the grass catching position, can be raised to tilt the bottom 45 rearwardly to cause accumulated clippings to fall toward the back of the carrier container, and can be elevated to the dumping position as illustrated in Figs. 2, 3 and 4. The carrier chains or cables 54 and 55 readily swing to accommodate any position of adjustment of the forward open side of the carrier container 37; and, these chains when swung rearwardly by elevation of the forward side of the container to the dumping position will elevate the rear of the carrier to a lesser height so that the accumulated clippings will not be spilled from the open front of the container.

As stated, the yoke handle 7 can be standard equipment on new lawn mowers, and on lawn mowers already in use this handle can be attached in the usual manner, as above described.

Figure 1 shows the mower with the grass catcher carrier 37 mounted upon the yoke handle, and in a position which it will normally occupy when the mower is in use. By grasping the knob 36 and moving the block 33, the operator can adjust the height at which the bottom 48 of the carrier is disposed above the ground. The catcher is so hung as to be perfectly free whether the operator is pushing the mower forward or is pulling it backwardly, and unevenness of the ground or terrain has no adverse effect upon its use and operation. The mounting is such that while the catcher container is held firmly in proper position, it is not held too rigidly, and consequently if the handle is lowered or dropped the catcher container structure will collapse naturally without strain or damage to the catcher or the hanging assembly.

When it is desired to shift the grass clippings back into the catcher, the knob 36 can be grasped and the block 33 can be moved substantially to the position as shown in Fig. 2, this movement causing the forward open side of the catcher carrier 37 to be elevated so that the bottom 48 is inclined downwardly and rearwardly, to cause the clippings to slide thereover into the back of the catcher. The catcher can then be adjusted to a grass catching position and the mowing operation can be continued until the lawn is mown, or until the catcher has accumulated a load of clippings. To dump the clippings from the catcher carrier, the knob 36 is moved upwardly to raise the carrier to substantially the position shown in Fig. 3, and the lawn mower handle is then swung forwardly, substantially in the direction indicated by the arrow, and the contents of the carrier are dumped into a basket or other suitable container, or into a pile.

From the foregoing, it will be seen that I have provided a handle structure and grass catcher which can be readily applied to lawn mowers, both hand and power operated, as manufactured and as already in use, and with which structure the catcher container is not removed or detached when it is desired to dump the contents; but which at the same time has the catcher carrier so mounted that it can be readily and conveniently and quickly removed and the mower can be used without the catcher.

While I have herein shown and described only certain specific embodiments of my invention and have suggested only certain possible modifications and changes, it will be appreciated that many changes and variations can be made in the form, construction, and arrangement of the parts, and in the manner of mounting and assembling the handle and the catcher, without departing from the spirit and scope of my invention.

I claim:

1. A lawn mower handle divided to provide two spaced apart side bars, a grass catcher movably disposed between the side bars and having its forward side movable longitudinally of the side bars, and means carried by the side bars to move the catcher longitudinally of the bars to elevate and lower the forward side thereof, said grass catcher being carried by the handle and being moved to the dumping position by forward swinging movement of said handle.

2. A lawn mower handle having two spaced apart tubular side portions, a grass catcher movably disposed between the side portions, means slidable longitudinally with respect to the tubular side portions, longitudinally slidable means movably mounted within the tubular side portions to move the forward end of the catcher longitudinally of the side portions of the handle to elevate and lower the forward side thereof.

3. A lawn mower grass catcher structure comprising with a handle divided to provide two spaced apart side bars, a grass catcher container movably and swingably mounted between the side bars, the movable mounting means including parts slidable longitudinally with respect to the spaced apart side bars of the handle portions, handle means at the outer ends of the side bars, longitudinally slidable means carried by the side bars to move the catcher carrier to elevate the forward side thereof, and a handle knob accessible from a position adjacent to the handle for actuating the catcher moving means, said grass catcher being carried by the handle and being moved to the dumping position by forward swinging movement of said handle.

4. A lawn mower grass catcher structure comprising a handle having tubular side portions, hand grip portion at the outer end of the handle, elongated longitudinally extending slots on the inner sides of the tubular side members, flexible cables endwise movably mounted in said tubular members with their ends adjacent to the slots, mounting bolts on the lower ends of the cables extending through the slots in the tubular members, adjusting handle means associated with the upper ends of the cables, a grass catcher carrier, means attaching the forward part of the carrier to said mounting bolts, and means swingably supporting the rear part of the carrier.

5. A lawn mower grass catcher comprising with lawn mower structure, a handle divided to provide two spaced apart side bars adjacent to the mower and having hand grip portions at its outer end, a grass catcher carrier comprising a substantially U-shaped supporting frame having a flexible wall depending therefrom and carrying a bottom portion, means movably mounting the forward side of the grass catcher carrier upon and for longitudinal sliding movement along the side bars, means swingably suspending the rear part of the grass catcher carrier from the handle, and means carried by the handle for elevating and lowering the movable forward portion of the grass catcher carrier by movement thereof longitudinally of the side portion of the handle, said grass catcher being carried by the handle and being moved to the dumping position by forward swinging movement of said handle.

6. A lawn mower grass catcher and handle structure comprising a handle portion made up of two tubular side members having their lower ends spaced apart a distance corresponding substantially to the width of a lawn mower and having their middle portions offset inwardly and then extending at their ends in substantially parallel relation slightly spaced apart, said side bar portions having elongated slots extending longitudinally thereof on the inner sides adjacent to both ends, a hand grip portion at the outer ends of the handle side bars, a transverse bar connecting the side bars in their middle portions, flexible cables movable endwise within each of the tubular side bars and having their ends adjacent to the upper and lower slots of each side bar, mounting bolts carried by the lower ends of the cables and extending through the slots, a grass catcher carrier, means connecting the forward side of said grass catcher carrier with said mounting bolts, means swingably mounting the rear portion of the carrier with respect to the middle portion of the handle, and means including a hand grip portion connected with the upper ends of the cables and available for moving said cables endwise within the tubular members.

JOHN O. HOLDEN.

REFERENCES CITED

The following references are of record in the file of this patent:

UNITED STATES PATENTS

| Number | Name | Date |
| --- | --- | --- |
| 409,053 | Miller | Aug. 13, 1889 |
| 1,622,923 | Pollifrone | Mar. 29, 1927 |
| 2,113,191 | Caudry | Apr. 5, 1938 |